United States Patent
Tsuji et al.

(10) Patent No.: US 8,506,311 B2
(45) Date of Patent: Aug. 13, 2013

(54) COMMUNICATION DEVICE

(75) Inventors: Yasushi Tsuji, Tokyo (JP); Satoshi Suzuki, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 13/299,454

(22) Filed: Nov. 18, 2011

(65) Prior Publication Data

US 2012/0135617 A1 May 31, 2012

(30) Foreign Application Priority Data

Nov. 29, 2010 (JP) ................................ P2010-264951

(51) Int. Cl.
*H01R 13/44* (2006.01)

(52) U.S. Cl.
USPC .......................................... 439/131; 439/528

(58) Field of Classification Search
USPC .................... 439/131, 528, 527, 575
See application file for complete search history.

(56) References Cited

U.S. PATENT DOCUMENTS

| 6,676,419 | B1* | 1/2004 | Lin et al. ...................... 439/76.1 |
| 7,479,041 | B1* | 1/2009 | Chen .............................. 439/630 |
| 7,771,215 | B1* | 8/2010 | Ni et al. ......................... 439/131 |
| 2010/0281209 | A1* | 11/2010 | Ni et al. ......................... 711/103 |
| 2010/0330828 | A1* | 12/2010 | Tang et al. ...................... 439/131 |
| 2011/0059636 | A1* | 3/2011 | Ni et al. ......................... 439/131 |
| 2011/0130017 | A1* | 6/2011 | Chou et al. ..................... 439/131 |
| 2011/0136536 | A1* | 6/2011 | Garudadri et al. .......... 455/550.1 |
| 2012/0015534 | A1* | 1/2012 | Wavra et al. ................... 439/131 |

FOREIGN PATENT DOCUMENTS

JP 2001-307031 A 11/2001

* cited by examiner

*Primary Examiner* — Gary F. Paumen
(74) *Attorney, Agent, or Firm* — Lerner, David, Littenberg, Krumholz & Mentlik, LLP

(57) ABSTRACT

A communication device is configured to perform data communications with a communication target while being connected to an information processing apparatus, and includes a communication unit and a holding unit. The communication unit is provided with a connector connectable to a connection port of the information processing apparatus and performs data communications with the communication target under control of the information processing apparatus. The holding unit holds the communication target. The holding unit is attached to the communication unit so as to be movable to a position where the holding unit covers the connector in a stored state, and movable to a position where the holding unit exposes the connector in a used state.

6 Claims, 11 Drawing Sheets

COMMUNICATION DEVICE

CROSS-REFERENCE TO RELATED APPLICATION

The present application claims priority from Japanese Patent Application No. JP 2010-264951 filed in the Japanese Patent Office on Nov. 29, 2010, the entire content of which is incorporated herein by reference.

BACKGROUND

The present disclosure relates to a communication device, and particularly relates to a communication device connectable, for example, to a universal serial bus (USB) interface provided in a personal computer to additionally provide the personal computer with a function of performing data communications with an IC card.

Nowadays, contactless communication systems typified by FeliCa (registered trademark of Sony Corporation) are widely used. These contactless communication systems are employed in, for example, ticket gate systems for public transportations such as trains and buses, electric money systems usable for various types of shops, automatic vending machines and the like, and other similar systems. For instance, in the case where such contactless communication system is employed in a ticket gate system, readers/writers are installed in ticket gate machines and IC cards (including mobile phones and the like each equipped with an embedded IC chip equivalent to the IC card) represented by Suica™ are used as train tickets.

The contactless communication system employs amplitude shift keying (ASK) modulation and load modulation for information transmission. Specifically, when a reader/writer transmits certain transmission information to an IC card, the reader/writer performs the ASK modulation on a carrier signal according to the certain transmission information and then transmits the resultant signal. On the other hand, when the IC card transmits certain response information to the reader/writer, the IC card performs the load modulation on a carrier signal to change the voltage of the carrier signal according to the certain response information (for example, see Japanese Unexamined Patent Application Publication No. 2001-307031).

In addition, the contactless communication systems are also used by home users in various situations using the Internet such as payment by electronic money for e-commerce, charge of electronic money, and personal authentication for various types of procedures.

In order to use a contactless communication system at home, a user generally uses a personal computer (hereinafter, abbreviated to a PC). For this purpose, it is general that the computer is equipped in advance with a built-in interface (such as a Felica® port) for data communication with an IC card or is made to establish a connection through a USB port with a reader/writer for data communications with an IC card.

Figure 1:
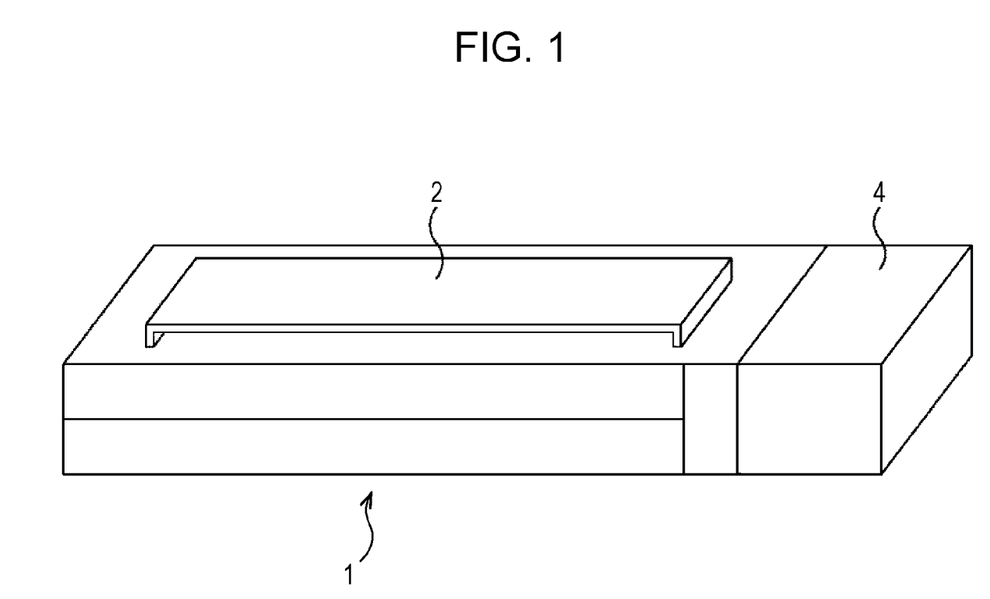
FIG. 1 shows an external appearance of a small reader/writer in the related art in a stored state.
Figure 2:
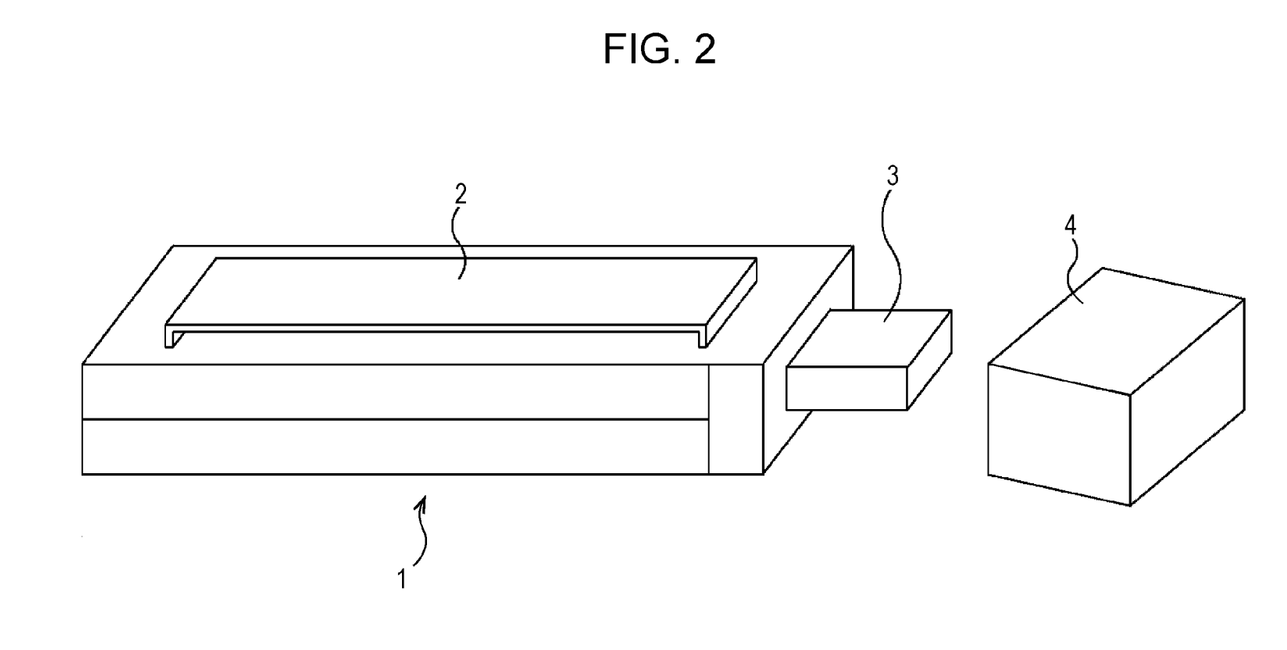
FIG. 2 shows an external appearance of a small reader/writer in the related art in a connected state.
Figure 3:
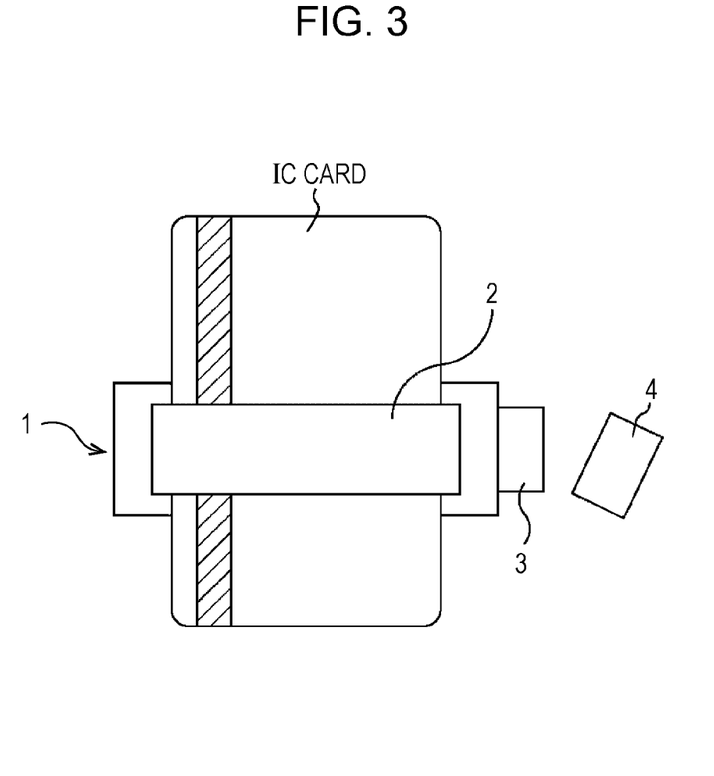
FIG. 3 shows an external appearance of a small reader/writer in the related art in a used state.

In order to meet demands for such data communications, various types of readers/writers are now commercially available. Among them, there are small readers/writers designed to achieve improvement in portability and space saving. FIGS. 1 to 3 show an example of such a small reader/writer.

FIG. 1 shows an external appearance of a reader/writer 1 in a stored state (where the reader/writer 1 is not connected to the PC), FIG. 2 shows an external appearance thereof in a connected state (where the reader/writer 1 is to be connected to the PC), and FIG. 3 shows an external appearance thereof in a used state (where the reader/writer 1 communicates data with an IC card).

The reader/writer 1 has an approximately rectangular parallelepiped shape which is elongated in one direction, and includes a card holder 2 and a USB connector 3. The card holder 2 is formed along an elongated main body of the reader/writer 1 and is configured to hold an IC card inserted therein. The USB connector 3 is provided at one end of the main body. Here, in the stored or any other state where the reader/writer 1 is not connected to the PC, a connector cap 4 is attached to the USB connector 3 to cover the USB connector 3.

SUMMARY

As shown in FIGS. 2 and 3, the connector cap 4 is removed from the reader/writer 1 when the reader/writer 1 is connected to the PC. For this reason, the connector cap 4 is likely to be lost while being removed.

In addition, the USB port of the PC and the USB connector 3 of the reader/writer 1 are placed to face each other to be connected to each other. In other words, the orientation of the reader/writer 1, i.e., the orientation of the card holder 2 is uniquely determined depending on the orientation of the USB port of the PC. For this reason, it is difficult to hold the IC card in some cases depending on the location and orientation of the USB port provided in the PC.

It is desirable to provide an easy-to-use reader/writer.

A communication device according to an embodiment of the present disclosure is configured to perform data communications with a communication target while being connected to an information processing apparatus. The communication device includes a communication unit provided with a connector connectable to a connection port of the information processing apparatus and configured to perform data communications with the communication target under control of the information processing apparatus, and a holding unit configured to hold the communication target. The holding unit is attached to the communication unit so as to be movable to a position where the holding unit covers the connector in a stored state, and movable to a position where the holding unit exposes the connector in a used state.

The communication unit may perform data communications with the communication target through either of first and second side surfaces of a casing of the communication unit, the first and second side surfaces being opposite surfaces of the casing.

The communication unit is provided with a guide mechanism in third and fourth side surfaces of the casing which are different from the first and second side surfaces and opposite surfaces, the guide mechanism having the holding unit attached thereto. Thus, the holding unit may be attached to the communication unit to be slidable by using the guide mechanism.

A direction of attaching the holding unit is changeable between a direction in which a portion of the holding unit to hold the communication target is located on the side of the first side surface and a direction in which the portion of the holding unit to hold the communication target is located on the side of the second side surface. The holding unit may hold the communication target on a selected one of the first and second opposite side surfaces of the casing of the communication unit, the selected side surface being determined by changing the direction of attaching the holding unit.

The communication unit includes an antenna, and may perform data communications with the communication target in a contactless manner under control of the information processing apparatus.

The communication unit may include two antennas supporting different communication modes, respectively.

The communication unit includes a contact terminal, and may perform data communications with the communication target through the contact terminal under control of the information processing apparatus.

According to an embodiment of the present disclosure, a holding unit is attached to a communication unit to be movable to a position where the holding unit covers a connector of the communication unit in a stored state, and movable to a position where the holding unit exposes the connector in a used state.

According to an embodiment of the present disclosure, an easy-to-use reader/writer may be provided.

DETAILED DESCRIPTION OF EMBODIMENTS

Hereinafter, best modes for carrying out the present disclosure (hereinafter referred to as embodiments) will be described in detail with reference to the drawings.

1. Embodiment

[Configuration Example of Reader/Writer]

An embodiment of the present disclosure is described by using a reader/writer connectable to a USB port of a PC or the like.

The reader/writer is connected to a USB port provided in a PC or the like, and performs data communications with an IC card (including a mobile phone or the like internally including an IC chip equivalent to the IC card) under the control of the PC. Note that the data communications with the IC card may be performed in either contactless communications or contact communications.

Figure 4:
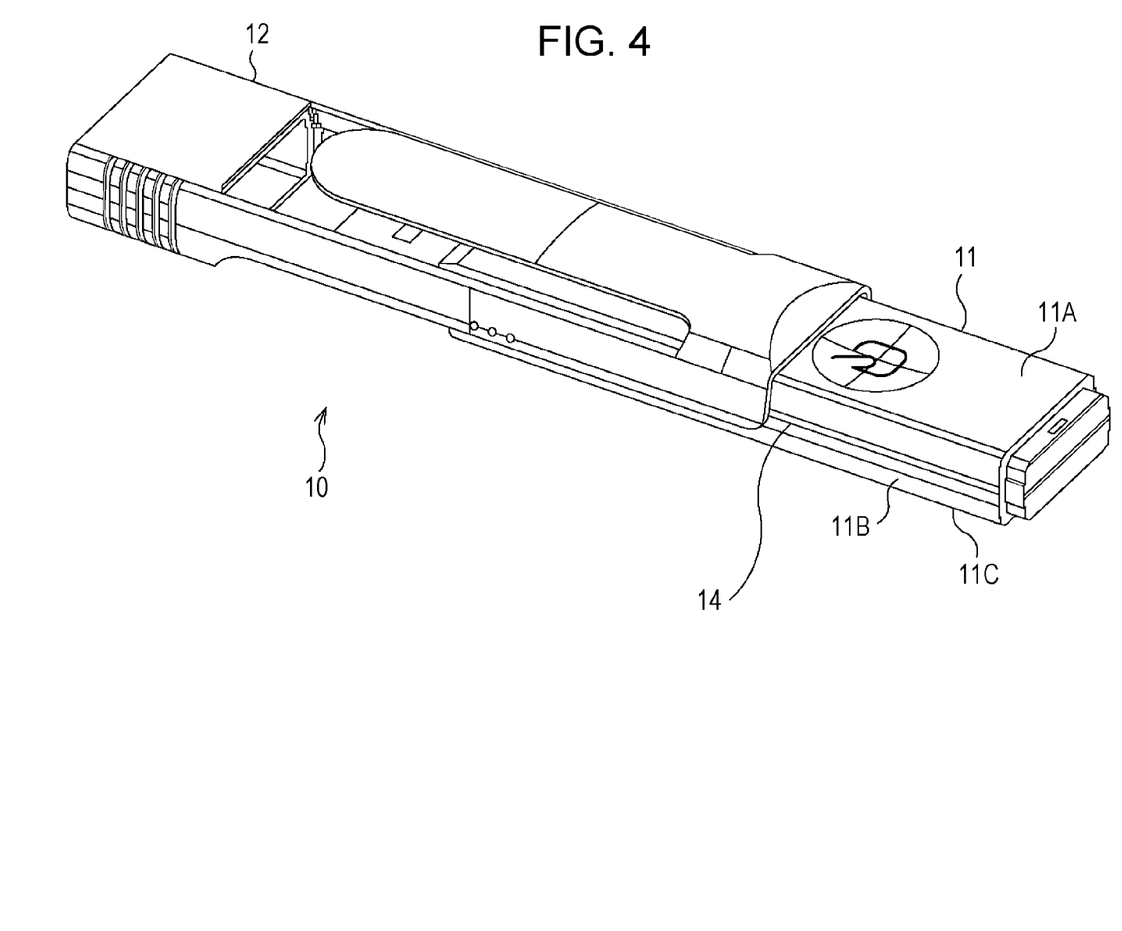
FIG. 4 shows an external appearance of a reader/writer to which the present disclosure is applied.
Figure 5:
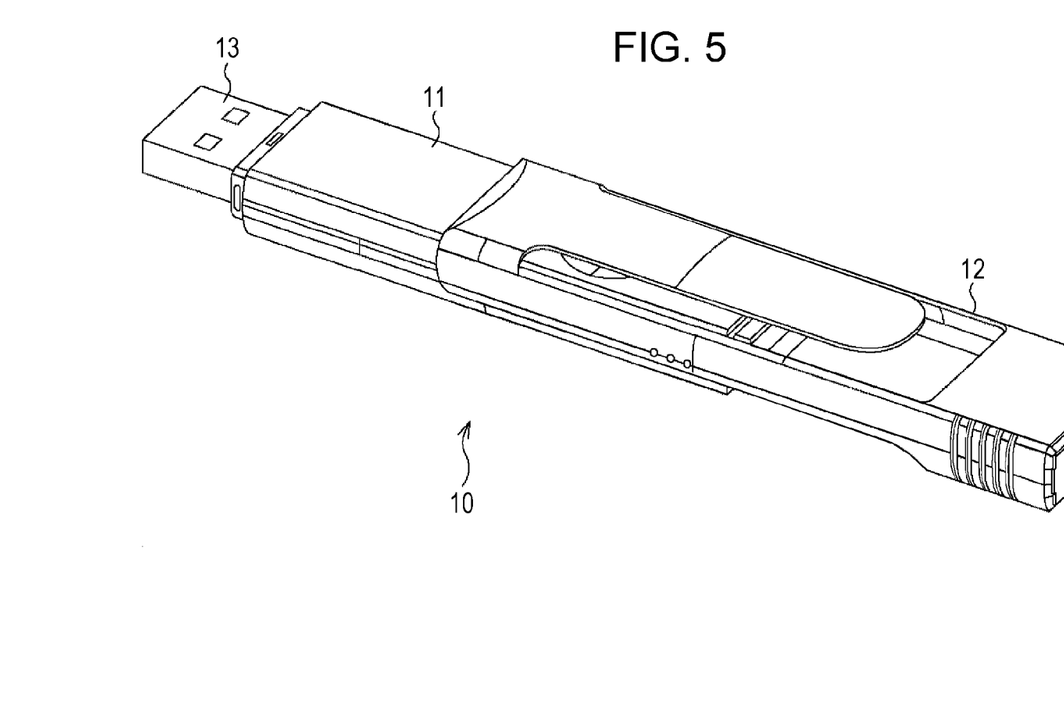
FIG. 5 shows another external appearance of the reader/writer to which the present disclosure is applied.

FIGS. 4 and 5 show external appearances of a reader/writer 10 according to an embodiment of the present disclosure. As shown in FIGS. 4 and 5, the reader/writer 10 has an approximately rectangular parallelepiped shape which is elongated in one direction and mainly includes a USB module 11 configured to perform communications with an IC card and a clip 12 configured to hold the IC card by pinching the IC card.

An ABS resin, for example, may be used as a material for a casing of the USB module 11 and the clip 12. Using an ABS resin can reduce the cost and weight of the reader/writer 10 to be manufactured. A rubber-based high hardness material such as an elastomer may alternatively be used as a material for the clip 12. When the clip 12 is made of a rubber-based high hardness material, an IC card pinched by the clip 12 can be prevented from being scratched.

The USB module 11 is capable of performing data communications with the IC card through either of side surfaces 11A and 11C. The USB module 11 includes at one end thereof in the longitudinal direction a USB connector 13 connectable to a USB port provided in a PC.

Figure 6A:
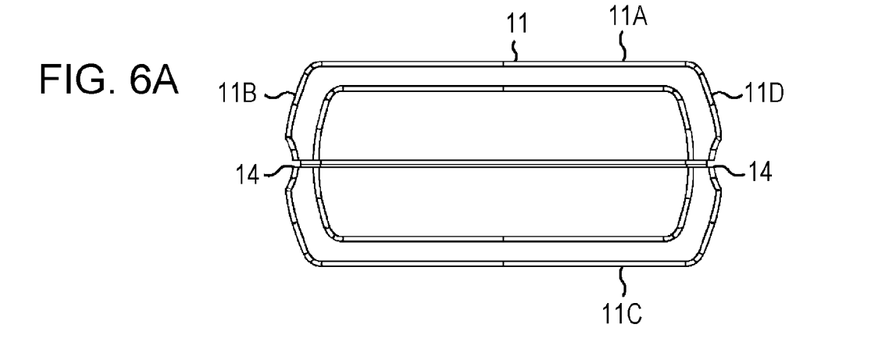
FIGS. 6A to 6C show cross-sectional views of the reader/writer to which the present disclosure is applied.
Figure 6B:
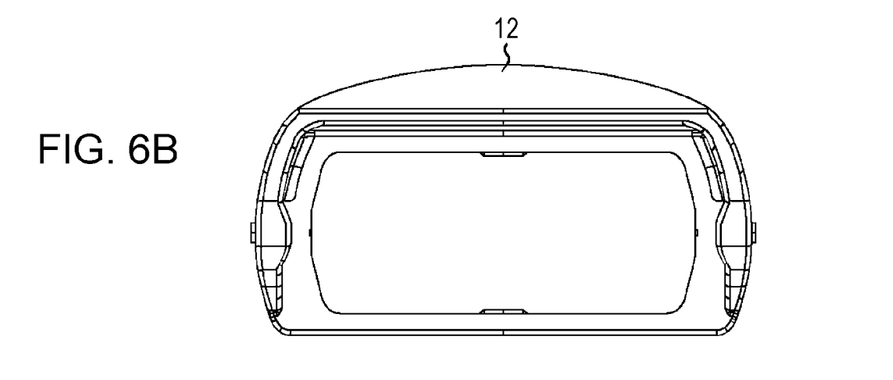
Figure 6C:
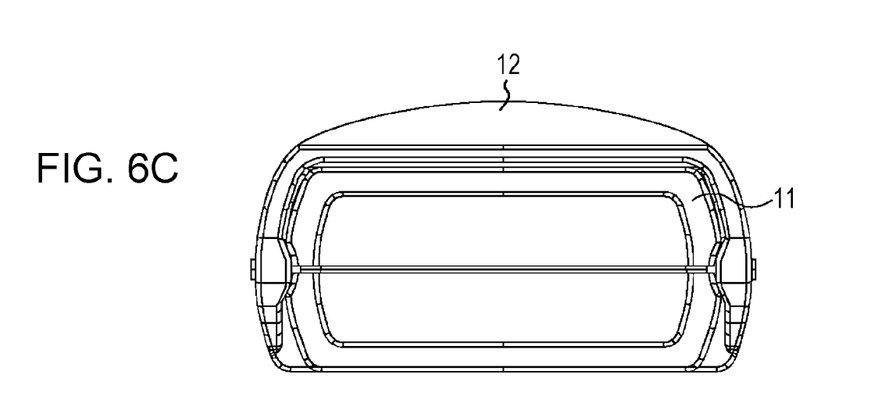

FIGS. 6A to 6C show cross sectional views of the reader/writer 10.

As shown in FIG. 6A, side surfaces 11B and 11D of the USB module 11 are provided with clip guides 14 in concave shapes that are used to attach the clip 12 to the USB module 11 so that the clip 12 can slide in the longitudinal direction of the USB module 11. On the other hand, as shown in FIG. 6B, the clip 12 is formed such that inner sides thereof have convex shapes. Thus, the clip 12 is attached to the USB module 11 with the convex shapes and the concave shapes fit to each other, as shown in FIG. 6C.

Figure 7A:
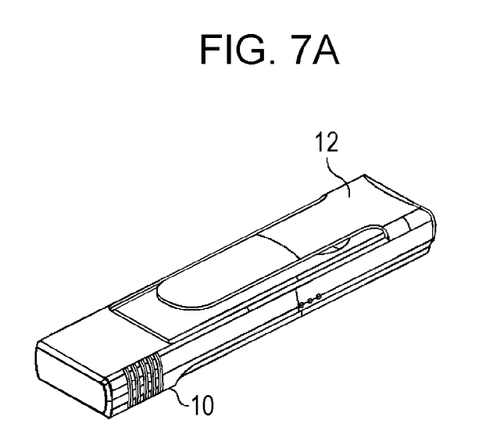
FIGS. 7A and 7B are views showing that the direction of attaching a clip to a USB module is changeable.
Figure 7B:
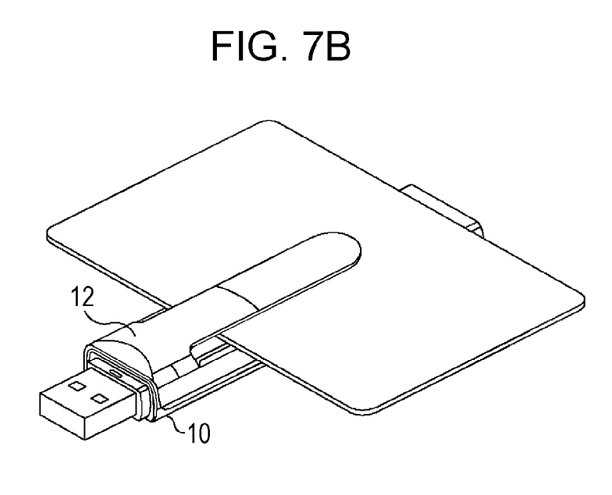

The clip 12 is slidable in the longitudinal direction of the reader/writer 10, and pinches and holds the IC card in a used state (where the reader/writer 10 is connected to the PC and is in data communications with the IC card), as shown in FIG. 7B. In addition, the clip 12 also functions as a connector cap to cover and protect the USB connector 13 in a stored state, as shown in FIG. 7A.

To be more specific, in the stored state, the clip 12 is slid in such a direction that the total length of the reader/writer 10 can be extended and thereby covers the USB connector 13. On the other hand, in the connected state and the used state, the clip 12 is slid in such a direction that the clip 12 can come to overlap the USB module 11 and thereby exposes the USB connector 13.

It should be noted that the clip 12 is attachable to the USB module 11 even when the orientation of the clip 12 is changed by 180 degrees in the longitudinal direction, as is apparent from FIGS. 4 and 5 in which the USB module 11 is directed in the same direction, but the orientation of the clip 12 is different by 180 degrees.

Figure 8:
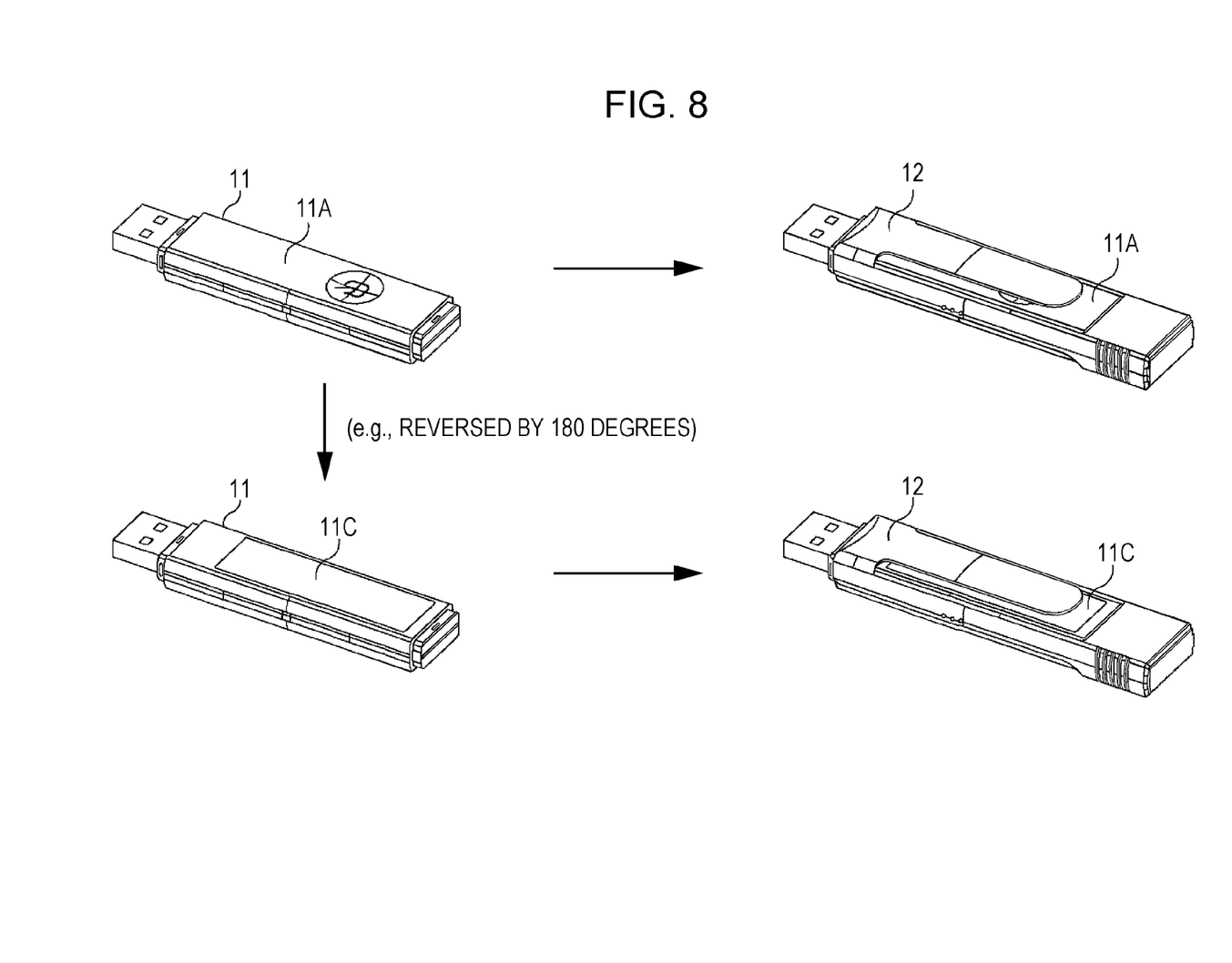
FIG. 8 is a view showing that the direction of attaching the clip to the USB module is changeable.

In addition, as shown in FIG. 8, the clip 12 is attachable to the USB module 11 such that an IC card pinch portion of the clip 12 is placed on either of the side surface 11A and side surface 11C of the USB module 11.

Accordingly, when connecting the reader/writer 10 to a PC, the position of an IC card as a communication target can be set at a desired position by changing the direction of attaching the clip 12 to the USB module 11 depending on the orientation of the USB port provided in the PC.

Figure 9:
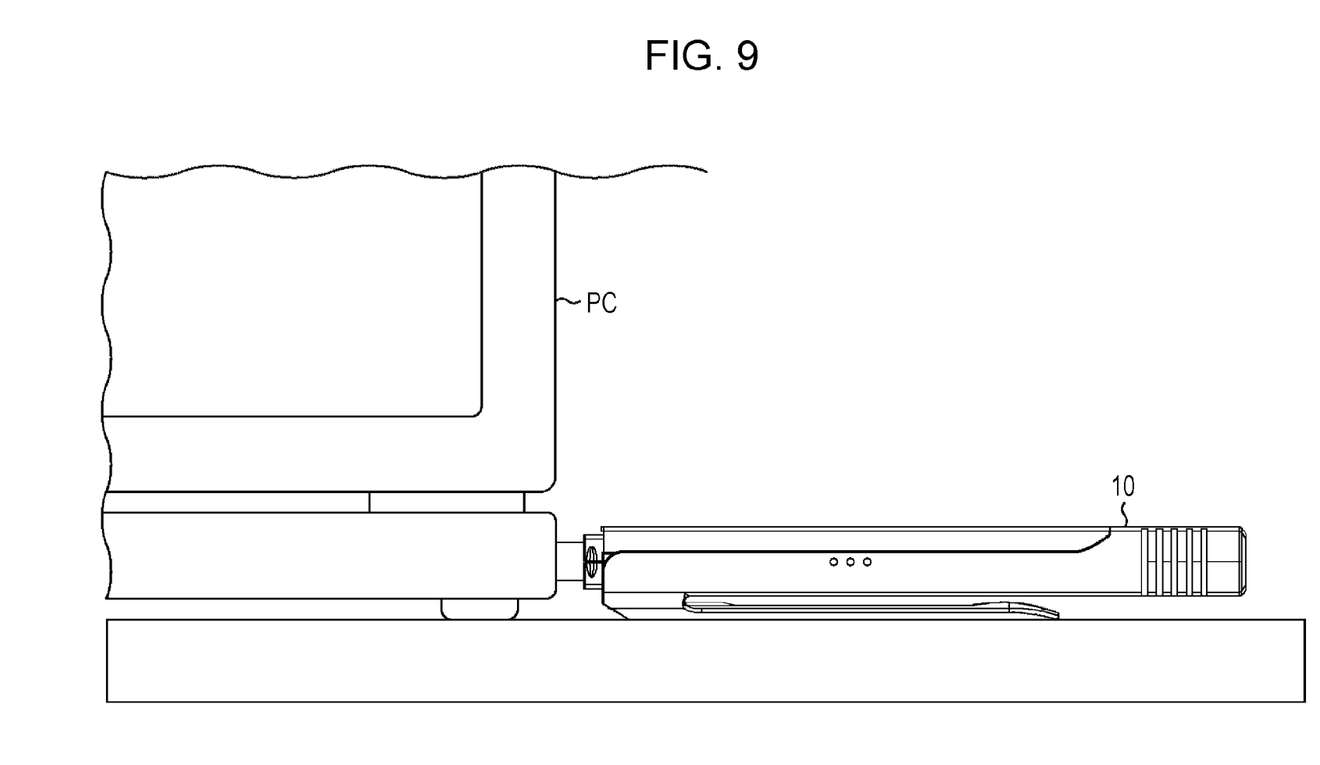
FIG. 9 is an outline drawing describing an orientation of the reader/writer connected to a PC.
Figure 10:
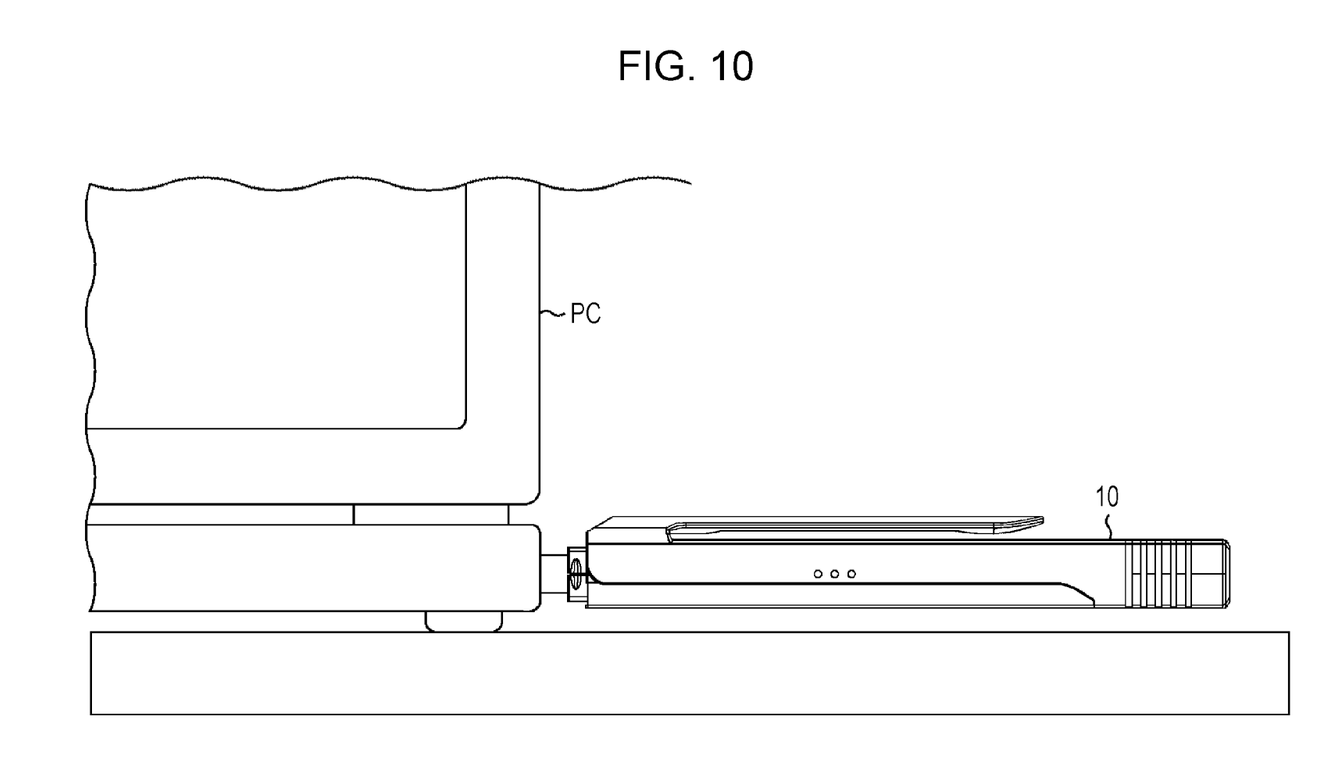
FIG. 10 is an outline drawing describing another orientation of the reader/writer connected to the PC.

For example, the clip 12 may be attached to the USB module 11 with the IC card pinch portion of the clip 12 facing downward as shown in FIG. 9, or to the contrary, with the IC card pinch portion of the clip 12 facing upward as shown in FIG. 10.

As described above, the USB module 11 is capable of performing communications with an IC card through either of the side surfaces 11A and 11C. Thus, the USB module 11 can perform data communications with a mobile phone equipped with an IC chip equivalent to an IC card, when the mobile phone is placed on top of the reader/writer 10 in the state shown in FIG. 9.

Figure 11:
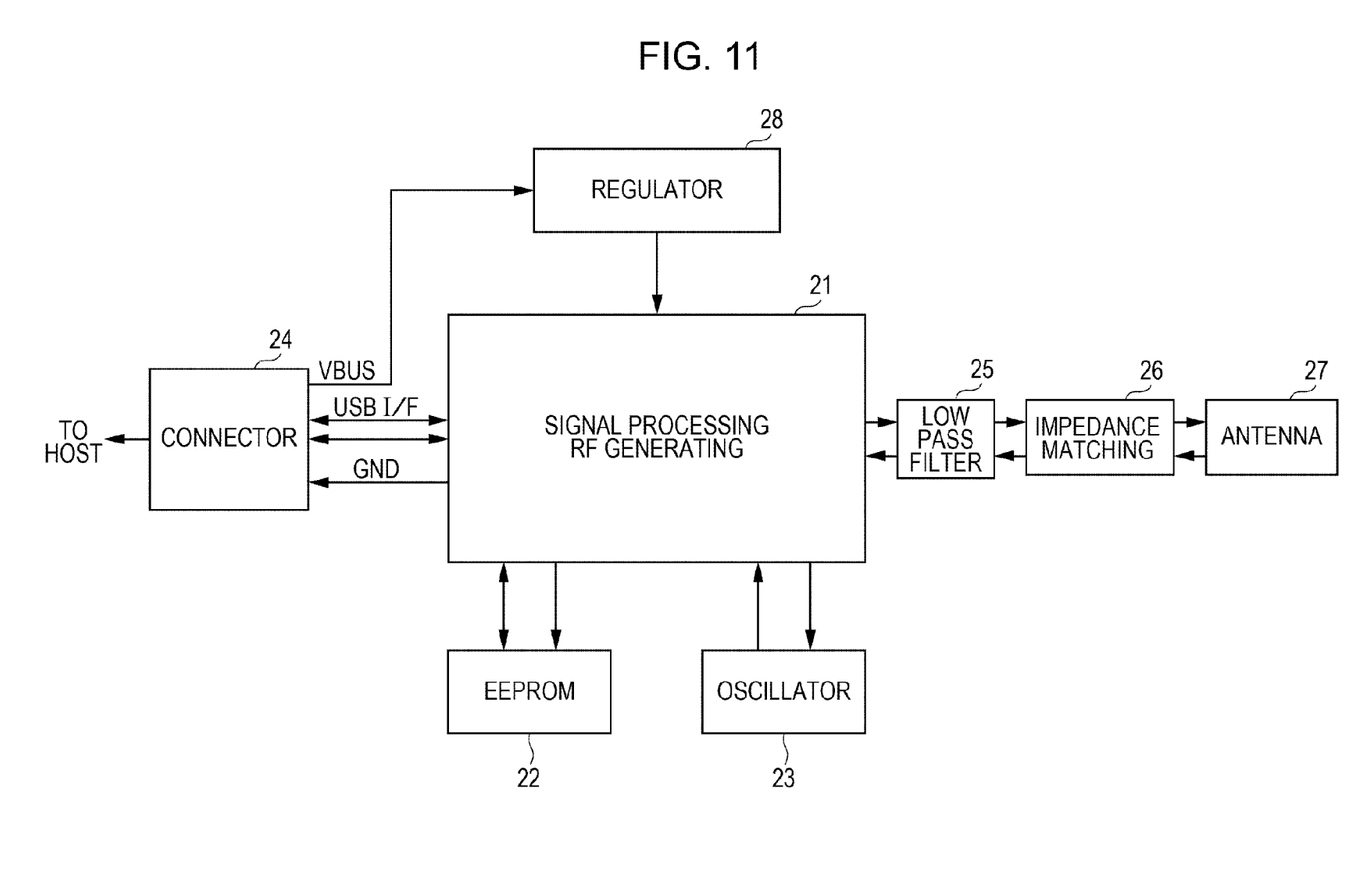
FIG. 11 is a block diagram showing an internal configuration example of the USB module.

FIG. 11 shows an internal configuration example of the USB module 11. In this example, a connector 24 functions as the USB connector 13. Antennas 27 are provided to both the side surfaces 11A and 11C, respectively.

Alternatively, the contactless communications with both the side surfaces 11A and 11C can be performed with only one antenna 27 arranged instead of arranging the antennas 27 in both the side surfaces 11A and 11C, respectively. Instead, if antennas supporting different communication modes are arranged in the two side surfaces 11A and 11C, respectively, the reader/writer can be configured to support the different communication modes by using the two side surfaces, respectively.

Other configuration elements of the USB module 11 are not greatly different from those in readers/writers in the related art, and therefore the description thereof is omitted.

As described above, the reader/writer 10 according to the embodiment of the present disclosure can expose or protect the USB connector 13 by sliding the clip 12. In addition, the direction of attaching the clip 12 to the USB module 11 is changeable. Thus, the position where to place an IC card can be set at any user-friendly position irrespective of the position and the orientation of a USB port provided in a PC.

The present embodiment is described with the USB port illustrated as a connection port. The present disclosure, however, is applicable to any system as long as a connection port having a vertically asymmetric shape to establish connection and a connector having the corresponding shape are connected to each other in the system.

In addition, the present embodiment is described by illustrating the case where contactless communications are performed with an IC card. Instead, a contact terminal for an IC card is provided to a portion of the USB module 11 which overlaps a certain portion of the held IC card, and data communications with the IC card may be performed through the contact terminal.

It should be noted that embodiments of the present disclosure are not limited to those described above, and that various modifications, combinations, sub-combinations and alterations may occur insofar as they are within the scope of the appended claims or the equivalents thereof.

What is claimed is:

1. A communication device configured to perform data communications with a communication target while being connected to an information processing apparatus, the communication device comprising:
    a communication unit provided with a connector connectable to a connection port of the information processing apparatus and configured to perform data communications with the communication target under control of the information processing apparatus; and
    a holding unit configured to hold the communication target,
    wherein the communication unit has a casing with a first side surface and a second side surface, said second side surface being opposite to the first side surface,
    wherein the holding unit is attachable to the communication unit so as to be movable to a position where the holding unit covers the connector in a stored state, and movable to a position where the holding unit exposes the connector in a used state, and
    wherein the holding unit is selectably changeable between a first arrangement in which the holding unit holds the communication target on the first side surface and a second arrangement in which the holding unit holds the communication target on the second side surface.

2. The communication device according to claim 1,
    wherein the communication unit is provided with a guide mechanism in third and fourth opposite side surfaces of the casing which are different from the first and second side surfaces and the holding unit is attached to the guide mechanism, and
    wherein the holding unit is attached to the communication unit to be slidable by using the guide mechanism.

3. The communication device according to claim 1, wherein
    the communication unit includes an antenna, and performs data communications with the communication target in a contactless manner under control of the information processing apparatus.

4. The communication device according to claim 3, wherein
    the communication unit includes two antennas supporting communication modes different from each other.

5. The communication device according to claim 1, wherein
    the communication unit includes a contact terminal, and performs data communications with the communication target through the contact terminal under control of the information processing apparatus.

6. A communication device configured to perform data communications with a communication target while being connected to an information processing apparatus, the communication device comprising:
    a communication unit provided with a connector connectable to a connection port of the information processing apparatus and configured to perform data communications with the communication target under control of the information processing apparatus; and
    a holding unit configured to hold the communication target,
    wherein the holding unit is attached to the communication unit so as to be movable to a position where the holding unit covers the connector in a stored state, and movable to a position where the holding unit exposes the connector in a used state,
    wherein a direction of attaching the holding unit is changeable between a direction in which a portion of the holding unit to hold the communication target is located on a first side surface and a direction in which the portion of the holding unit to hold the communication target is located on a second side surface, and
    wherein the holding unit holds the communication target on a selected one of the first and second opposite side surfaces of a casing of the communication unit, the selected side surface being determined by changing the direction of attaching the holding unit.

* * * * *